United States Patent [19]

Moyer et al.

[11] Patent Number: 4,822,060
[45] Date of Patent: Apr. 18, 1989

[54] WOVEN TUBULAR GASKET WITH CONTINUOUS INTEGRAL ATTACHMENT MEANS

[75] Inventors: James D. Moyer, Downingtown; John K. Neuhauser, West Chester, both of Pa.; Thomas B. Conaghan, Rock Hall, Md.; J. Sellers Kite, Glenmore, Pa.

[73] Assignee: The Bentley-Harris Manufacturing Company, Lionville, Pa.

[21] Appl. No.: 760,716

[22] Filed: Jul. 30, 1985

Related U.S. Application Data

[63] Continuation-in-part of Ser. No. 703,836, Feb. 21, 1985, abandoned.

[51] Int. Cl.$^4$ .............. F06B 7/16; F16J 15/02
[52] U.S. Cl. .................. 277/166; 49/485; 49/492; 49/493; 49/498; 87/9; 87/13; 126/190; 277/181; 277/186; 277/189; 277/230
[58] Field of Search ......... 277/230, 181, 189, 186, 277/166, 229; 49/492, 493, 494, 479, 485; 126/190; 87/5, 6, 13, 8, 9

[56] References Cited

U.S. PATENT DOCUMENTS

| | | | |
|---|---|---|---|
| 1,153,162 | 9/1915 | Howe | 277/189 X |
| 2,121,854 | 6/1938 | Breer . | |
| 2,121,893 | 6/1938 | Tea | 49/498 |
| 2,219,962 | 10/1940 | Reynolds | 49/479 |
| 2,223,954 | 12/1940 | Ford . | |
| 2,299,956 | 10/1942 | Spraragen . | |
| 2,329,994 | 9/1943 | Kingman | 277/230 X |
| 2,347,158 | 4/1944 | Spraragen . | |
| 2,574,124 | 11/1951 | Schlegel . | |
| 2,579,072 | 12/1951 | Harris . | |
| 2,607,965 | 8/1952 | Gagnier | 49/492 |
| 2,612,665 | 10/1952 | Scott | 49/492 |
| 2,657,438 | 11/1952 | Spraragen | 49/492 |
| 2,665,458 | 1/1954 | Wilcox | 49/479 |
| 2,716,788 | 9/1955 | Naramore . | |
| 2,719,331 | 10/1955 | Harris . | |
| 2,720,685 | 10/1955 | Harris . | |
| 2,761,203 | 9/1956 | DeWitti Sr. | 277/230 X |
| 2,767,444 | 10/1956 | Spraragen . | |
| 2,882,082 | 4/1959 | Poltorak et al. . | |
| 2,924,471 | 2/1960 | Poltorak et al. . | |
| 2,938,249 | 5/1960 | Milne | 49/492 |
| 3,071,826 | 1/1963 | Ziffer | 49/492 |
| 3,112,536 | 12/1963 | Gagnier . | |
| 3,167,826 | 2/1965 | Wetzl et al. | 49/492 |
| 3,487,511 | 1/1970 | Frohlich . | |
| 3,564,966 | 2/1971 | Powell . | |
| 3,578,764 | 5/1971 | Nunnally | 87/6 |
| 3,737,972 | 6/1973 | Smoot | 49/492 X |
| 3,812,316 | 5/1974 | Milburn | 277/230 X |
| 3,846,608 | 11/1974 | Valles | 277/230 X |
| 3,911,785 | 10/1975 | Hood . | |
| 4,122,323 | 10/1978 | Staats . | |
| 4,170,921 | 10/1979 | Repass | 87/6 |
| 4,517,759 | 5/1985 | Wall | 87/6 |
| 4,538,381 | 9/1985 | Vogel | 49/493 X |

FOREIGN PATENT DOCUMENTS

| | | | |
|---|---|---|---|
| 1080870 | 10/1960 | Fed. Rep. of Germany . | |
| 1831370 | 2/1961 | Fed. Rep. of Germany . | |
| 2613626 | 4/1975 | Fed. Rep. of Germany . | |
| 1203833 | 1/1960 | France | 49/492 |
| 2491120 | 4/1982 | France . | |
| 599528 | 11/1959 | Italy | 126/190 |
| 690906 | 4/1953 | United Kingdom . | |
| 718345 | 11/1954 | United Kingdom . | |
| 2110816 | 6/1983 | United Kingdom | 126/190 |

*Primary Examiner*—Allan N. Shoap
*Attorney, Agent, or Firm*—John T. Synnestvedt; Charles H. Lindrooth

[57] ABSTRACT

This invention provides a woven tubular gasket having a continuous integral attachment means which is contained within the woven tubular members and which has protrusions which extend through or are extendable through the walls of the woven tubular member or members and are adapted to engage openings in an appropriate surface or substrate on which the gasket is to be attached. The method of this invention provides for continuously forming the combination of the attachment means and the woven tubular member. The attachment means is fed continuously into the interior of the woven tubular member as it is formed to thereby incorporate the attachment means into the interior of the woven tubular member.

8 Claims, 3 Drawing Sheets

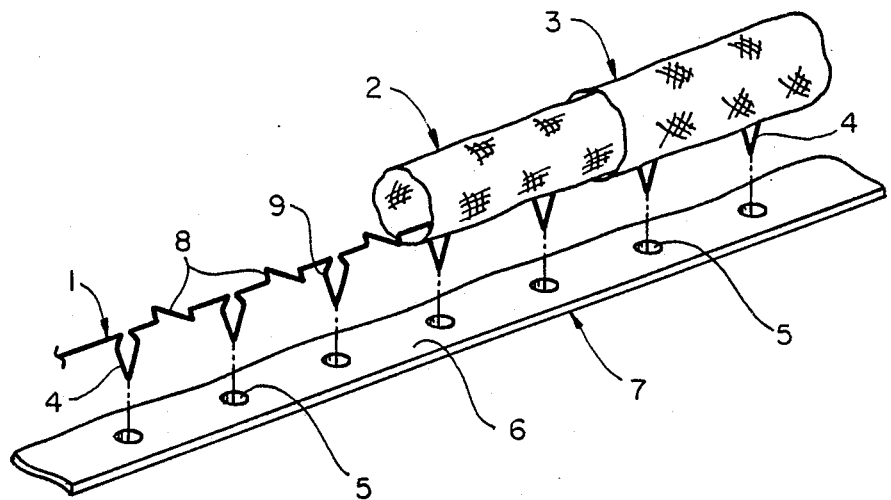
FIG_1
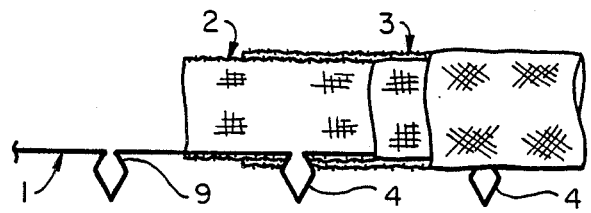
FIG_2
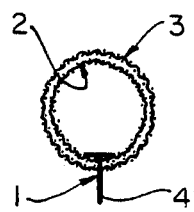 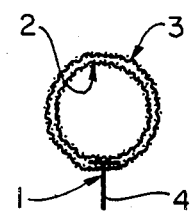
FIG_3   FIG_4

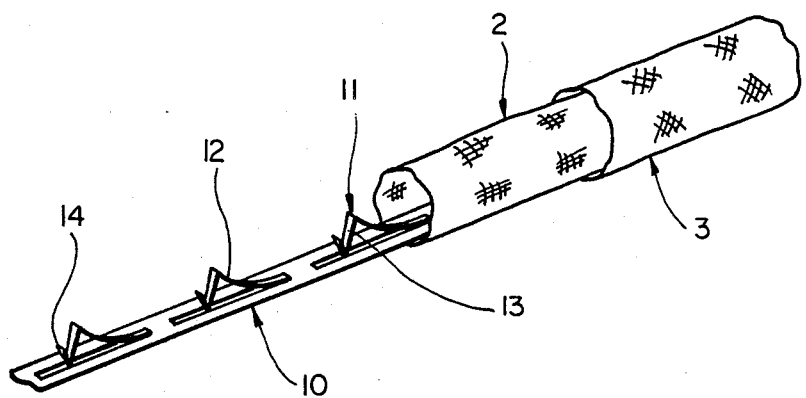
FIG_5
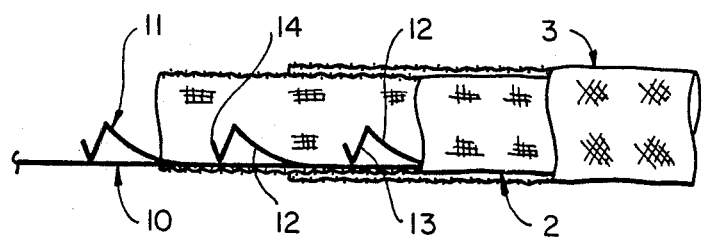
FIG_6
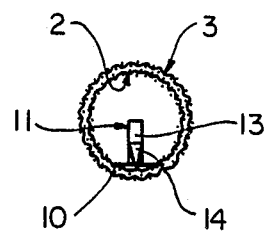 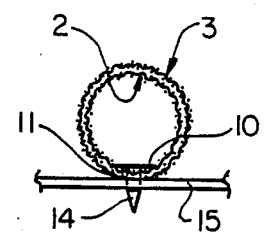
FIG_7  FIG_8

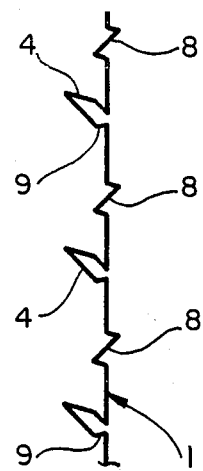
FIG_9
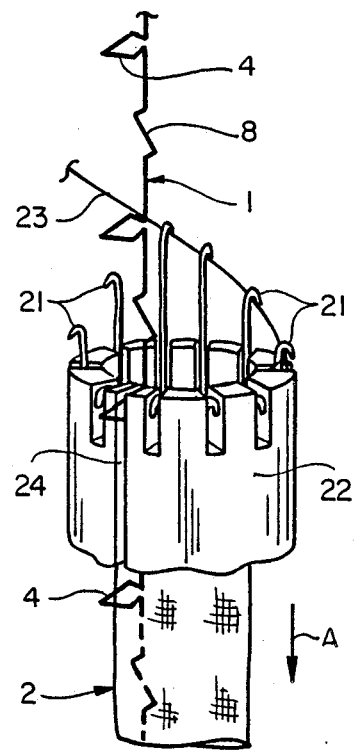
FIG_10
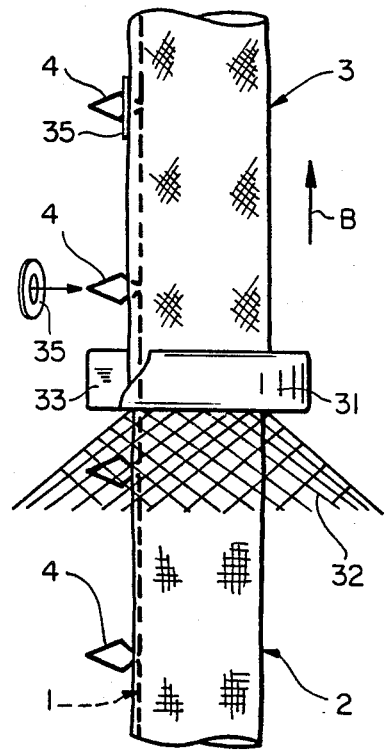
FIG_11

WOVEN TUBULAR GASKET WITH CONTINUOUS INTEGRAL ATTACHMENT MEANS

RELATED APPLICATION

This application is a continuation-in-part of Ser. No. 703,836 filed Feb. 21, 1985.

FIELD OF THE INVENTION

This invention relates to woven tubular gaskets and the attachment thereof to surfaces and substrates. One particular embodiment of this invention relates to knitted and braided wire and fiberglass gaskets for high temperature use.

BACKGROUND OF THE INVENTION

Woven tubular gaskets have been used as oven door gaskets and seals and typically have been made from the combination of an inner tubular member of knitted wire and an outer tubular member of braided fiberglass. This structure has proven to be durable in high temperature use and to provide a good seal. The inner knitted wire tubular member, sometimes called the bulb, provides a long-term resilient support for the fiberglass tubular member which provides the desired seal.

The method of attaching the knitted wire/braided fiberglass tubular gasket to ovens or oven doors has typically comprised clamping a portion of the exterior braided fiberglass sleeve with clamps or between two pieces of the oven or oven door. Examples of such oven gaskets and their attachment are shown in U.S. Pat. Nos. 2,219,962 to Reynolds et al.; 3,578,764 to Nunnally et al.; 3,812,316 to Milburn; 3,846,608 to Valles and 4,122,323 to Staats.

Other methods of attaching oven gaskets have included the use of "thumb clips" and frame clips. The thumb clip method involves placing a flat frame having holes in it inside the tubular gasket, aligning those holes with holes in the oven liner or oven door, then inserting the thumb clip through the hole in the oven, through the woven tubular members of the gasket and through the hole in the frame inside the gasket. The clip is curved such that once it is fully inserted, it exerts a spring action on the frame to hold the frame toward the oven liner or oven door surface. The use of frame clips involves placing spring clips in holes in a frame, sliding a length of the woven tubular gasket over the frame and clips, cutting an opening in the woven gasket at each clip location to expose the clip, then pressing the clip into an opening in the oven liner or oven door.

These means and methods of attaching knitted wire/braided fiberglass tubular gaskets have various problems associated with them, the number and degree of which depend on the method. These problems include difficulty in assembly, necessity of assembly from the back of the oven liner or oven door, necessity of disassembly for service or replacement of the gasket, excess labor required in assembly, high cost of materials and/or labor and requirement for temporary holding means to prevent the gasket from shifting on the frame before assembly on the oven.

Woven tubular gaskets have been used for a variety of uses in addition to oven seals. One of the common uses is for weather stripping. As with woven tubular gaskets used for oven seals, the gaskets in these other uses have likewise been attached to the various surfaces and substrates by clamping a portion of the gasket. Examples of such gaskets and their attachment are shown in U.S. Pat. Nos. 2,121,854 to Breer; 2,716,788 to Naramore; 2,767,444 to Spraragen; 2,882,082 and 2,924,471 to Poltorak et al.; and U.K. Patent Specification No. 690,906 of Van Tine.

DESCRIPTION OF THE INVENTION

In one basic aspect, this invention provides a gasket for sealing a space between two surfaces comprising:
 (a) at least one woven tubular member; and
 (b) a continuous attachment means positioned inside the tubular member being adapted to hold the tubular member in place when assembled on one of said surfaces and having protrusions adapted to extend outwardly through the weave of the tubular member without breaking or cutting a significant number of the woven strands and adapted to engage said surface to thereby connect the attachment means to said surface.

In another aspect, this invention provides a gasket comprising at least one woven tubular member and a continuous attachment means being positioned inside the woven tubular member and having preformed protrusions adapted to extend outwardly through the weave of the tubular member without breaking or cutting a significant number of the woven strands of the tubular member and adapted to engage openings in a surface to connect the attachment means to the surface. The protrusions adapted to extend out through the weave of the tubular member can be of any suitable shape which can be contained within the interior of the woven tubular member then be extended through the wall of the tubular member. This aspect of the invention is particularly useful when the protrusions are extended through the wall of the tubular member and into an opening in a surface when the gasket is installed on that surface.

In another aspect, this invention provides methods for forming the woven tubular gaskets described above. In one basic aspect, the method according to this invention for forming a gasket comprising a woven tubular member and a continuous integral attachment means comprising the steps of:
 (a) feeding into the interior of a woven tubular member, as the woven tubular member is formed, a continuous preformed attachment means having protrusions adapted to emerge through the weave of the woven tubular member and extend outwardly from the tubular member;
 (b) forming the woven tubular member and incorporating into the interior of the woven tubular member the continuous preformed attachment means; and
 (c) causing said protrusions of the preformed attachment means to extend through the weave of the woven tubular member.

In a more preferred aspect, the method of this invention involves a method for forming a gasket comprising a braided tubular member and a continuous attachment means comprising the steps of:
 (a) feeding into the interior of a braided tubular member, as the tubular member is braided, a continuous preformed attachment means having protrusions adapted to emerge through the braid and extend outwardly from the braided tubular member; and
 (b) braiding the braided tubular member whereby the strands are braided around the base portion of the protrusions whereby said protrusions extend outwardly from the wall of the braided tubular member and the remaining portion of the attachment means is positioned inside the braided tubular member.

In a more preferred aspect of the method of this invention, the attachment means, which is fed into the interior of the braided tubular member as the braided tubular member is formed, has a knitted tubular member around the attachment means whereby the protrusions extend outwardly through the weave of the knitted tubular member.

A most preferred method of this invention involves a method of forming a heat resistant gasket, comprising an inner knitted wire tubular member, an outer braided fiberglass tubular member and a continuous integral attachment means, comprising the steps of:

(a) feeding into the interior of a knitted wire tubular member, as the tubular member is knitted, a continuous preformed attachment means comprising a metal wire or strip having protrusions adapted to emerge through the knitted wire and extend outwardly from the tubular member;

(b) causing said protrusions to emerge through the knitted wire;

(c) feeding the knitted wire tubular member containing the continuous attachment means through a braider; and (d) braiding the fiberglass tubular member around the knitted wire tubular member whereby the protrusions of the attachment means extend outwardly from the braided fiberglass tubular member.

The woven tubular member which forms one element of the gasket of this invention may be formed by knitting, by braiding or by wrapping around a woven fabric sheet and joining the opposing edge portions of the sheet, for example by sewing or by ultrasonic welding, to form a woven tubular member. The preferred forms of the woven tubular members for the gaskets of this invention are the knitted and braided tubular gasket elements. The woven tubular member may be formed of any suitable material for the desired purpose for which the gasket will be used, as the following examples illustrate. For oven gaskets and seals, knitted stainless steel wire and braided fiberglass are preferred because of the high temperature durability of those materials. For use as gaskets for radio frequency interference shielding, such as on doors of computer cabinets, the preferred material may be braided copper wire or braided tinned copper wire. For use in other applications, for example weather stripping, materials such as cotton, polyester, polypropylene, or other fibers may be appropriate.

The gasket according to this invention may contain one or more woven tubular members depending on the desired end use. Each woven tubular member may be made from any material which is the same as or different from the material in the other tubular members, again depending on the end use of the gasket. The layers of tubular members are not limited, since, according to the gasket and method of the present invention, each layer of the woven tubular member is simply added by feeding the first tubular member or members into the interior of next tubular member as it is formed by knitting, braiding or wrapping around and closing a fabric sheet. Thus, a gasket can be made having any desired layers of woven tubular members and having an integral continuous attachment means.

The attachment means element of the present invention can be of various shapes and made of various materials provided that the attachment means can be adapted to function according to the present invention and fulfill the two requirements of (a) being capable of being positioned inside at least one of the woven tubular members and (b) having protrusions which extend through the weave of the woven tubular member or members without breaking or cutting a significant number of the strands of the woven tubular member or members and extend outwardly from the wall of the woven tubular member or, alternatively, having portions thereof which are preformed or precut and adapted to become protrusions by being extended out through the weave of the woven tubular member or members, without cutting or breaking a significant number of the strands of the woven tubular member. Those portions of the attachment means adapted to become protrusions can be extended to protrude out through the wall of the woven tubular member or members at any time after the attachment means has been assembled inside at least one of the woven tubular members.

The attachment means can be formed from any desired stock and any desired material depending upon the end use of the gasket and the required performance properties of the gasket. The attachment means may be made from metal, plastic or other material which is suitable for providing the necessary strength to hold the gasket in place on the surface or substrate on which the gasket is to perform its sealing function. The attachment means may be formed from round, square or similar shaped stock (such as wire), flat stock (such as a metal band, tape or ribbon) or other suitable stock. For example, a metal wire can be formed to have periodic protrusions whereby the wire can be positioned inside at least one of the woven tubular members of the gasket and the protrusions formed in the wire can extend outwardly through the weave of the woven tubular member.

It is usually desirable to have some lateral shape in the attachment means on the inside of the woven tubular member which lies in a plane which is approximately 90° or perpendicular to the protruding portion of the attachment means to provide some lateral stability or other desired properties of the gasket. The plane in which the lateral portion extends need not be perpendicular to the protrusions, but may be at some other angle depending upon the stability, shape or other properties desired in the gasket. For example, when the attachment means is formed from a metal wire and the protrusions are formed in one plane to extend outward through the wall of the woven tubular member, a sine wave or zig zag shape can be formed in a plane perpendicular to the protrusions. This sine wave or zig zag pattern in the metal wire attachment means provides lateral stability to prevent the gasket from rolling, provides greater flexibility in assembly of the gasket, since the metal wire attachment means will have longitudinal flexibility which may be necessary as the protrusions are snapped into receiving holes in a surface or substrate, and the sine wave or zig zag pattern provides a greater surface area of contact between the attachment means and the inside of the woven tubular member or members to help prevent pull-out or tearing of the woven tubular member or members. As a further example, when the attachment means is formed from a metal band or ribbon, the protrusions can be cut or stamped from the band itself and adapted to extend substantially perpendicularly from the plane of the band through the wall of the woven tubular member or members. Alternatively the protrusions can be separately formed and attached to the metal band, for example, by welding. When a metal band or tape is used, it provides in itself the lateral stability and other functions which may be desirable.

The protrusions on the attachment means must be of a form or shape to satisfy the two requirements of (a) to attach the gasket to the desired surface or substrate; and (b) capable of either extending through or being extendable through the weave of the woven tubular member or members without cutting or breaking a substantial number of the strands thereof. Thus, where the protrusions are preformed to extend through the wall of the woven tubular member, the protrusions must be shaped such that they will pass through the weave of the woven tubular member after it is formed without substantially permanently interfering with the weave or strands of the woven tubular member. Where the protrusions are preformed for the woven tubular member to be formed around them, they must be shaped such that the woven tubular member can be formed around the protrusions such as by overbraiding whereby the strands, as they are braided, go around the protrusions and form the braided tubular member around the bases of the protrusions. When the protrusions are preformed and adapted to be extended out through the wall of the woven tubular member or members, the protrusions must be shaped to pierce through the weave of the woven tubular member and preferably between the individual strands of the woven tubular member by pushing the individual strands aside as the protrusion emerges through the wall of the woven tubular member. The protrusions should not break or cut a significant number of the strands of the woven tubular member. If a significant number of strands are cut or broken, then the woven tubular member element of the gasket will be more likely to unravel, fray out or tear during installation or continued use. In most instances, it is possible to cut or break a few of the strands of the woven tubular member without changing or interfering with its properties or performance, whereas with some woven tubular members in certain end use applications it will not be acceptable to break any of the strands. Therefore the protrusions of the attachment means must be designed to disturb no more than an acceptable portion of the strands in the wall of the woven tubular member.

The attachment means used in the gaskets of this invention are integral, continuous attachment means. By "integral", it is meant that the attachment means is incorporated into an interior portion of at least one of the woven tubular members of the gasket. By "continuous", it is meant that the attachment means can be one continual uninterrupted member, such as a wire or band having protrusions formed therein or extended therefrom, or the attachment means can be segmented into segments of desired length, for example where certain flexibility is desired in the gasket. Where the gasket comprises two or more woven tubular members, the attachment means may be positioned inside one, part or all of the woven tubular members with the protrusions extending or extendable through the wall or walls of the woven tubular member or members.

Another aspect of this invention provides a retention means for the protrusions extending through the wall or walls of the woven tubular member or members. When the gasket according to this invention is made with the protrusions of the attachment means extending through the wall or walls of the woven tubular member, it is possible for the protrusion to be pulled back through the wall or walls of the woven tubular member or members during the handling or bending of the gasket prior to assembly on the desired surface, such as an oven door. When a protrusion is pulled back to the interior of the tubular member, it is sometimes difficult to force the protrusion back through the wall or walls of the woven tubular members, particularly in the correct location and orientation. In order to prevent the protrusion from being pulled into the interior of the tubular member, a retaining means can be provided to hold the protrusions in the proper position extending from the surface of the tubular members. Such a retaining means can be of any material or shape which will attach to or hold the protrusion and which provides sufficient surface area against the exterior wall of the tubular member to prevent the protrusion from being pulled in through the wall to the interior of the tubular members. The retaining means can be simple washers which can be snapped over the shoulders or other configuration of the protrusion or can be a continuous strip of material which grips the protrusions or is attached to the protrusions. The retaining means must be of a configuration to not interfere with the assembly of the gasket on the desired surface. For example, the retaining means can be a thin washer or strip of material which lays flat against the outer surface of the tubular member and is attached to or holds the base of the extending protrusion. Alternatively, the retaining means can be of a configuration which can be removed from the gasket just prior to assembly of the gasket on the desired surface. In a further alternative, the retaining means could be removed from between the gasket and the surface after the gasket has been installed on the surface.

The method aspects of this invention are basically as described above. In more detail, when the attachment means comprises preformed protrusions which extend through the weave of the woven tubular member and outwardly from the wall of the woven tubular member, the preformed attachment means is fed into the interior of the woven tubular member as the woven tubular member is formed. In some instances, such as braiding the woven tubular member, the weave of the woven tubular member can be formed around the protrusions and the woven strands will settle around the bases of the protrusions against the attachment means which is inside the woven tubular member. In other instances, the preformed attachment means is fed into the interior of the woven tubular member as it is formed such as knitting, braiding or wrapping around a fabric sheet and joining the opposing edge portions thereof to form the tubular member, whereby the protrusions are urged against the inside of the wall of the already woven tubular member and with the appropriate amount of pressure and the proper shape of the protrusion, the protrusions will "pop through" the weave of the woven tubular member, i.e., between the strands thereof by temporarily moving the strands aside to make an opening in the weave through which the protrusion passes. After the protrusion has extended through the wall, the weave will normally readjust itself around the base of the protrusion, if the base of the protrusion is smaller than the other portions of the protrusion. When this method is performed with a weave that is not too tight, the proper shape of the protrusion and the proper pressure to urge the protrusions through the weave of the woven tubular member, none of the strands of the woven tubular member will be broken. Using the methods of this invention, any combination of the knitted, braided or woven tubular members of various combinations of materials and having the continuous integral attachment means inside one or all of the woven tubular members can be produced.

In another aspect, this invention provides for an assembly comprising a surface having a gasket attached thereto whereby the gasket is attached for sealing the space between said surface and another surface wherein the gasket comprises:

(a) at least one woven tubular member; and
(b) a continuous attachment means positioned inside the tubular member, being adapted to hold the tubular member in place when assembled on one of said surfaces, and having protrusions extending outwardly through the weave of the tubular member without breaking or cutting a significant number of the woven strands and adapted to engage said surface to thereby connect the attachment means to said surface.

A particular assembly to which this assembly relates is where the surface is part of an oven or oven door. A preferred gasket for the oven or oven door assembly is the knitted wire/braided fiberglass type of gasket described above.

BRIEF DESCRIPTION OF THE DRAWINGS

FIG. 1 shows the gasket of the invention in a cutaway perspective view and shows how the gasket is mounted on a substrate.

FIG. 2 shows the gasket of this invention in a partially cutaway elevation view.

FIGS. 3 and 4 are end section views showing the position of the attachment means.

FIGS. 5 and 6 are partially cutaway views showing an alternative attachment means.

FIG. 7 is an end view of the alternative attachment means.

FIG. 8 is an end view of the alternative attachment means with the protrusion extended through the woven tubular member.

FIG. 9 shows a continuous preformed wire attachment means.

FIG. 10 shows how the continuous preformed wire attachment means is fed into a circular knitter as a knitted tubular member is formed.

FIG. 11 shows how the knitted tubular member containing the wire attachment means made as shown in FIG. 10 is fed to a braider to overbraid a second tubular member over the knitted tubular member.

DETAILED DESCRIPTION OF PARTICULAR EMBODIMENT OF THE INVENTION

The gasket of this invention and the method of making the gasket are best exemplified by detailed description of preferred embodiments of this invention. FIGS. 1-11 illustrate a number of preferred embodiments and show a number of the methods of this invention which are used to produce the gaskets.

FIG. 1 shows a perspective cutaway view of one of a preferred embodiment of the present invention in which attachment means 1 is positioned inside a knitted wire tubular bulb 2 which in turn is positioned inside a braided fiberglass tubular outer gasket 3. Attachment means 1 has protrusions 4 which extend through the weave of the wall of knitted bulb 2 and the braided fiberglass tubular member 3. Protrusions 4 are adapted to snap into openings 5 in surface 6 of structural element 7, which structural element can be any member which is to be sealed to another surface such as an oven, oven liner, oven door, and the like. Attachment means 1 also contains zig zag portions 8 which lie in a plane substantially perpendicular to the plane of protrusions 4. Zig zag portions 8 provide lateral stability to the woven tubular members 2 and 3 to prevent them from rolling and provide additional flexibility for attachment means 1 as well as providing added surface area for holding tubular members 2 and 3 to surface 6 of structural element 7.

FIG. 2 shows the same gasket assembly in a cutaway elevation view showing the main portion of attachment means 1 inside the knitted tubular member 2 and braided fiberglass member 3 with protrusions 4 extending out through the weave of the tubular members to extend outwardly from the walls of the tubular members.

FIG. 3 is an end view of the same gasket assembly showing attachment means 1 positioned inside knitted wire tubular member 2 and having protrusions 4 extending out through the weave of the knitted tube 2 and braided tube 3.

FIG. 4 shows an alternative configuration for the attachment means wherein the attachment means 1 is positioned between the knitted tubular member 2 and the braided tubular member 3 whereby protrusions 4 of the attachment means extend out through braided tubular member 3.

In this embodiment, protrusions 4 of the attachment means are tapered to enable the protrusions to be extended through the knit of knitted wire tubular member 2 and to enable the fiberglass braid of braided tubular member 3 to be braided over the protrusion without cutting or breaking the knitted wire strands or the braided fiberglass strands. The taper on protrusions 4 also are adapted to enable the protrusions to enter openings 5 of substrate 7 and once the protrusions of the attachment means are pressed into openings 5 shoulders 9 are adapted to hold the attachment means in openings 5 on substrate 7 and prevent its removal. However, the gasket can be removed from substrate 7 by applying sufficient force to overcome the retaining action of shoulders 9, thus providing a straightforward means for replacement or service of the gasket without disassembly of the oven or other device of which surface 6 is a part. Shoulders 9 are positioned close to the base of protrusions 4 to provide for a tight fit of the attachment means 1 against surface 6 of substrate 7 thereby clamping tubular members 2 and 3 between the attachment means and surface 6 of substrate 7.

FIGS. 5-8 illustrate an alternative embodiment of the present invention wherein the attachment means contains preformed protrusions which are adapted to be extended through the weave of the tubular members after the gasket is assembled, for example when the gasket is installed on the desired surface or substrate.

FIGS. 5 and 6 show cutaway views of another embodiment of the present invention wherein attachment means 10 is positioned inside knitted wire tubular member 2 and fiberglass braided tubular member 3 and wherein attachment means 10 has preformed portions 11 which comprise a spring portion 12, a protrusion portion 13 and a retaining barb 14. After this gasket is assembled, it is used by pressing preformed portion 11 downward to force protrusion 13 and barb 14 to emerge through the weave of the knitted wire tubular member and braided fiberglass tubular member and extend outwardly from the surface of the tubular members. Protrusion 13 and barb 14 are tapered in such a way to enable them to emerge through the weave of the knitted and braided tubular members without cutting or breaking a significant number of the knitted or braided strands of the tubular members. FIG. 7 shows an end view of this embodiment of the invention and FIG. 8 shows the gasket of this embodiment of the invention after installation on substrate 15. FIG. 8 illustrates how preformed portion 11 can be pressed downward to extend protrusion 13 and barb 14 through the walls of the tubular members 2 and 3 and through an opening in substrate 15. Barb 14 locks under the surface of substrate 15 and the spring action of portion 12 of the preformed attachment means holds attachment means 10 in compression towards substrate 15 and thereby holds tubular members 2 and 3 in close contact with the surface of substrate 15. In this embodiment the flat portion of attachment means 10 which lies perpendicular to the protrusion 13 holds the tubular members 2 and 3 in a stable position preventing rolling and preventing pull out.

FIG. 9 shows a preformed wire attachment means useful in a preferred embodiment of the gasket of this invention. The preformed wire has protrusions 4 with retaining shoulders 9 and which has zig zag portions 8. FIG. 10 shows how a basic gasket of this invention is assembled wherein the gasket has a attachment means with protrusions extending through the weave of a woven tubular member. In this example the attachment means is the preformed wire of FIG. 9 and the woven tubular member is a knitted wire tube. Knitted wire tubular member 2 is formed in the circular knitter having knitting needles 21 in needle cylinder 22 which knits wire 23 to form knitted tubular member 2. Preformed retaining means 1 is fed into the interior of the knitted wire tubular member as it is formed with protrusions 4 passing through slot 24 in the needle cylinder whereby tubular member 2 is knitted around the bases of protrusions 4. The attachment means and the knitted tubular member move in direction A through the knitter at the same speed.

In an alternative method, preformed wire attachment means 1 can be fed (at the same linear speed as the knitted wire tubular member 2 moves out of the needle cylinder) into the center of the needle cylinder and the center of knitted wire tubular member 2 then urged with an appropriate means against the side of the knitted wire tubular member whereby protrusions 4 of attachment means 1 are forced through and between the knitted wire strands of knitted tubular member 2. The protrusions are forced to "pop through" the wall of knitted tubular member 2 without breaking the knitted wire forming knitted tubular member 2. In this alternative method it may not be necessary to have a slot in the needle cylinder for the protrusions 4 to pass through.

The gasket produced by the method shown in FIG. 10 is the basic form of the gasket of this invention. While FIG. 10 shows a preformed wire attachment means and a knitted wire tubular member, this same method can be used with any appropriate attachment means, for example as shown in FIG. 5, and can be formed by braiding instead of the knitting shown in FIG. 10 or can be formed by wrapping around and joining the opposing edge regions of a flat woven fabric to form the woven tubular member. The protrusions of the attachment means can be incorporated into the woven tubular member, such as by knitting, braiding or sewing, as the tubular member is formed or they can be incorporated into the woven tubular member by feeding the attachment means into the interior of the tubular member and applying appropriate urging means to force the protrusions to pop or emerge through the weave of the woven tubular member after it is formed.

FIG. 11 shows the next step in the method of making a preferred embodiment of the present invention, namely a gasket comprising a continuous integral preformed wire attachment means inside a knitted wire tubular bulb over which is braided a fiberglass tubular member. In the method shown in FIG. 11, knitted wire tubular member 2 containing attachment means 1, as produced in the method shown in FIG. 10, is fed through a braider having forming ring 31 which collects and shapes the fiberglass strands 32 being fed from the braider carriers. The knitted wire tubular member 2 and the braided fiberglass tubular member 3 are moved through the braider in direction B. Slot 33 in former ring 31 allows the protrusions 4 of attachment means 1 to pass through the former rings and allows the fiberglass strands 32 to be formed in a braided configuration around the base of each protrusion 4.

Also shown in FIG. 11 is an example of a retaining means to prevent protrusions 4 from being pulled through the walls of tubular members 2, 3. In this embodiment the retaining means is simply washer 35 which is pressed over protrusion 4 until it pops into place under shoulders 9 of protrusion 4. The inside diameter of washer 35 is such that it will be held in place by shoulders 9 of protrusion 4, and the outside diameter of washer 4 is sufficient to provide enough surface area to prevent the washer from being pulled through the wall of braided tubular member 3 and/or knitted tubular member 2 when the gasket is handled, bent or otherwise flexed before being installed on the desired surface. An added function of retaining means washer 35 is that the inside diameter of the washer can be sized so that the washer fits snuggly around the base of protrusion 4 underneath shoulders 9. This will provide a greater dimensional accuracy of the spacing between protrusions 4 by preventing attachment means 1 from stretching or elongating during processing, handling or assembly through deformation of protrusions 4, which can occur by widening the base of protrusion 4. Therefore it can be seen that the selection of an appropriate retaining means can have added benefits of providing increased dimensional precision for the gasket. Such dimensional stability can also be obtained by using a retaining means which is a continuous strip of material such as metal or plastic which has appropriately sized holes similar to the inside diameter of the washer which can be pressed in position on each of protrusions 4, thereby providing even more dimensional precision of the spacing between protrusions 4 on the gasket.

The above description relative to FIGS. 1–11 describes various embodiments of the present invention. As one skilled in the art will appreciate, various combinations of materials and woven structures within the teachings and scope of this invention can produce a variety of gaskets for various desired purposes and uses.

We claim:

1. A gasket for sealing a space between two surfaces, one of said surfaces having a series of spaced openings therethrough, said series being arranged in the pattern desired for the gasket, said gasket comprising:
   (a) at least one woven tubular member having a hollow interior and comprising woven strands; and
   (b) an integral continuous attachment means positioned inside the tubular member, being adapted to hold the tubular member in said pattern when assembled on said one of said surfaces, said attachment means comprising a flexible metal wire extending generally axially inside the hollow interior of said woven tubular member, said flexible metal wire being of diameter representing only a minor fractional percentage of the hollow interior diameter of the surrounding woven tubular member to provide freedom for limited relative lateral flexing of the flexible metal wire within the surrounding woven tubular member, said flexible metal wire having a lateral portion to provide stability for the attachment means inside the tubular member while permitting said limited flexing by being engageable with the interior of the woven tubular member to thereby limit the extent of said flexing, said flexible metal wire further having protrusions protruding from bases and which protrusions have shoulder means for engaging said openings in said one surface and which protrusions extend outwardly through the weave of the tubular member and thus form apertures in the weave without breaking or cutting a significant number of the woven strands and substantially without permanently interfering with the strands of the tubular member, with the result that said apertures in the weave around the bases of the protrusions are smaller than the shoulder means of the protrusions and which protrusions are adapted to engage said openings in said one surface to thereby connect the attachment means to said one surface.

2. A gasket according to claim 1 wherein the tubular member is knitted.

3. A gasket according to claim 1 wherein the tubular member is braided.

4. A gasket according to claim 1 wherein the gasket further comprises at least a second woven tubular member positioned inside the first tubular member and wherein the attachment means is positioned inside the second tubular member and the protrusions extend outwardly through the weaves of both the first and second tubular members and are adapted to engage said openings in said one surface.

5. A gasket according to claim 1 wherein the gasket further comprises at least a second woven tubular member positioned inside the first tubular member and wherein the attachment means is positioned between the first tubular member and the second tubular member.

6. A gasket according to claim 1 wherein the gasket further comprises separate retaining means positioned on the outside of the tubular member and adapted to prevent the protrusions from being pulled through the weave of the tubular member toward the inside of the tubular member.

7. A heat resistant gasketing assembly for sealing space between an oven and an oven door, one of said oven and oven door having a series of spaced openings therethrough, said series being arranged in the pattern desired for the gasket of the assembly, said gasket including woven strands comprising:
  (a) at least one woven wire tubular member having a hollow interior; and
  (b) at least one woven fiberglass tubular member surrounding same;
and an integral continuous attachment means for removably positioning with relation to and attaching said tubular members to said one of said oven and oven door comprising a flexible metal wire extending generally axially inside the hollow interior of said woven wire tubular member and against the interior of said woven wire tubular member, said flexible metal wire being of diameter representing only a minor fractional percentage of the hollow interior diameter of the surrounding woven wire tubular member to provide freedom for limited relative lateral flexing of the flexible metal wire within the surrounding woven wire tubular member, said flexible metal wire having a lateral portion extending laterally back and forth along the length of the metal wire to provide stability for the attachment means inside the tubular members while permitting said limited flexing by being engageable with the interior of the woven wire tubular member to thereby limit the extent of said flexing, said flexible metal wire further having preformed integral protrusions extending substantially perpendicularly to said lateral portion and which have shoulder means for engaging said openings in said one of said oven and oven door to thereby connect the attachment means and the tubular members to said one of said oven and oven door in the pattern desired for the gasket and which extend outwardly through the weave of the tubular members without breaking or cutting a substantial number of the woven strands and substantially without permanently interfering with the strands of the tubular members.

8. A gasket for sealing a space between two surfaces, one of said surfaces having a series of spaced openings therethrough, said series being arranged in the pattern desired for the gasket, said gasket comprising:
  (a) at least one woven tubular member having a hollow interior and comprising woven strands; and
  (b) an integral continuous attachment means positioned inside the tubular member, being adapted to hold the tubular member in said pattern when assembled on said one of said surfaces, said attachment means comprising a continuous elongated flexible member extending generally axially inside the hollow interior of said woven tubular member, said flexible member being of cross-sectional area representing only a minor fractional percentage of the cross-sectional area of the hollow interior of the surrounding woven tubular member to provide freedom for limited relative lateral flexing of the flexible member within the surrounding woven tubular member, said flexible member having a lateral portion to provide stability for the attachment means inside the tubular member while permitting said limited flexing by being engageable with the interior of the woven tubular member to thereby limit the extent of said flexing, said flexible member further having protrusions protruding from bases and which protrusions have shoulder means for engaging said openings in said one surface and which extend outwardly through the weave of the tubular member and thus form apertures in the weave without breaking or cutting a significant number of the woven strands and substantially without permanently interfering with the strands of the tubular member, with the result that said apertures in the weave around the bases of the protrusions are smaller than the shoulder means of the protrusions and which protrusions are adapted to engage said one surface to thereby connect the attachment means to said one surface.

* * * * *